Sept. 24, 1929.   L. HORNBOSTEL   1,729,442
FLEXIBLE GEAR WHEEL
Filed May 14, 1927   3 Sheets-Sheet 1

WITNESSES:

INVENTOR
Lloyd Hornbostel.
BY
ATTORNEY

Sept. 24, 1929.  L. HORNBOSTEL  1,729,442
FLEXIBLE GEAR WHEEL
Filed May 14, 1927   3 Sheets-Sheet 2

WITNESSES:
CJ Weller.
W. D. O'Connor

INVENTOR
Lloyd. Hornbostel.
BY
Wesley G. Carr
ATTORNEY

Sept. 24, 1929.  L. HORNBOSTEL  1,729,442
FLEXIBLE GEAR WHEEL
Filed May 14, 1927   3 Sheets-Sheet 3
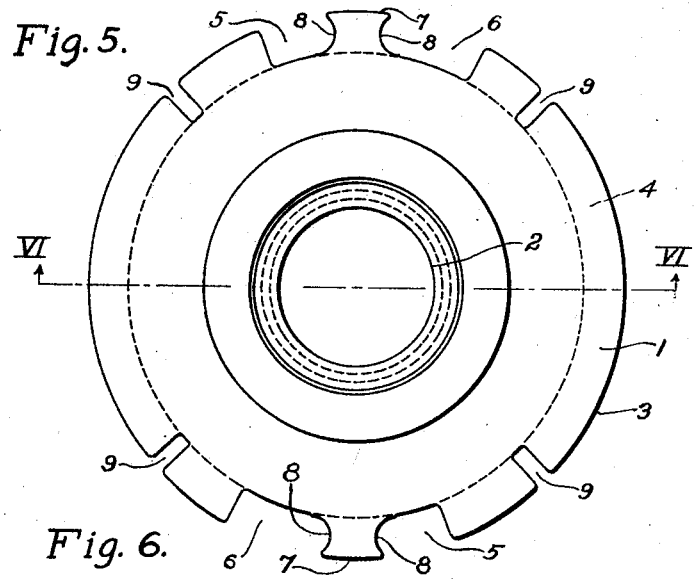
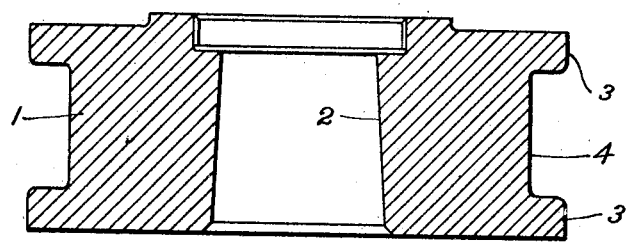
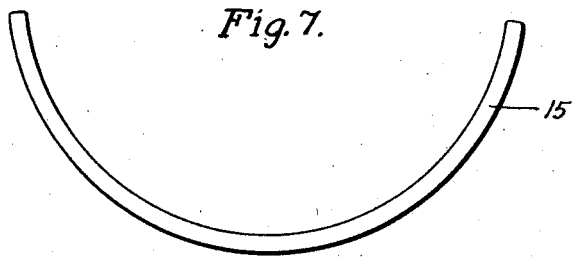
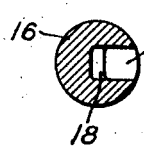
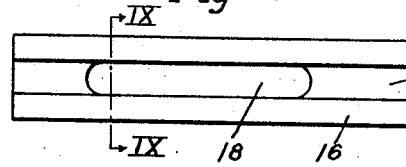
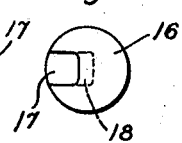
WITNESSES:
C. J. Weller.
W. D. O'Connor
INVENTOR
Lloyd Hornbostel.
BY
Wesley S. Sloan
ATTORNEY Patented Sept. 24, 1929

1,729,442

UNITED STATES PATENT OFFICE

LLOYD HORNBOSTEL, OF BELOIT, WISCONSIN, ASSIGNOR TO WESTINGHOUSE ELECTRIC & MANUFACTURING COMPANY, A CORPORATION OF PENNSYLVANIA

FLEXIBLE GEAR WHEEL

Application filed May 14, 1927. Serial No. 191,317.

My invention relates generally to gear wheels and particularly to gear wheels embodying flexible elements to permit resilient angular displacement of the gear rim relative to the supporting center or hub structure.

An object of my invention is to provide a flexible gear wheel or pinion member of compact and durable construction for use on electric locomotives, and similar structures wherein the available space is limited.

Another object of my invention is to provide a flexible gear wheel in which the spring elements have a rising load-deflection characteristic, thereby providing considerable resilience at low torques and comparative stiffness at high torques.

Another object of my invention is to provide a flexible gear wheel that shall be inexpensive to manufacture and that is adapted to be easily assembled and taken apart.

It is also an object of my invention to provide a flexible gear wheel in which the flexible elements serve to retain the parts of the gear wheel in their respective operative positions without the assistance of special fastening means.

My present invention is directed to a flexible gear wheel comprising the usual hub or center portion and gear rim portion, together with cooperating spring elements that have substantially the shape of segments of an annulus, such as described in the copending application of Claude Bethel, filed November 5, 1925, Serial No. 67,023, and assigned to the Westinghouse Electric & Manufacturing company.

In practicing my invention, I provide a gear center having pairs of lugs on its outer periphery and a gear rim having cooperating single lug members that are adapted to pass between the lugs on the center portion. The lug members on both the gear rim and center are provided with concave faces for engaging cylindrical spring sockets mounted on the ends of the annular spring members.

Figure 1:
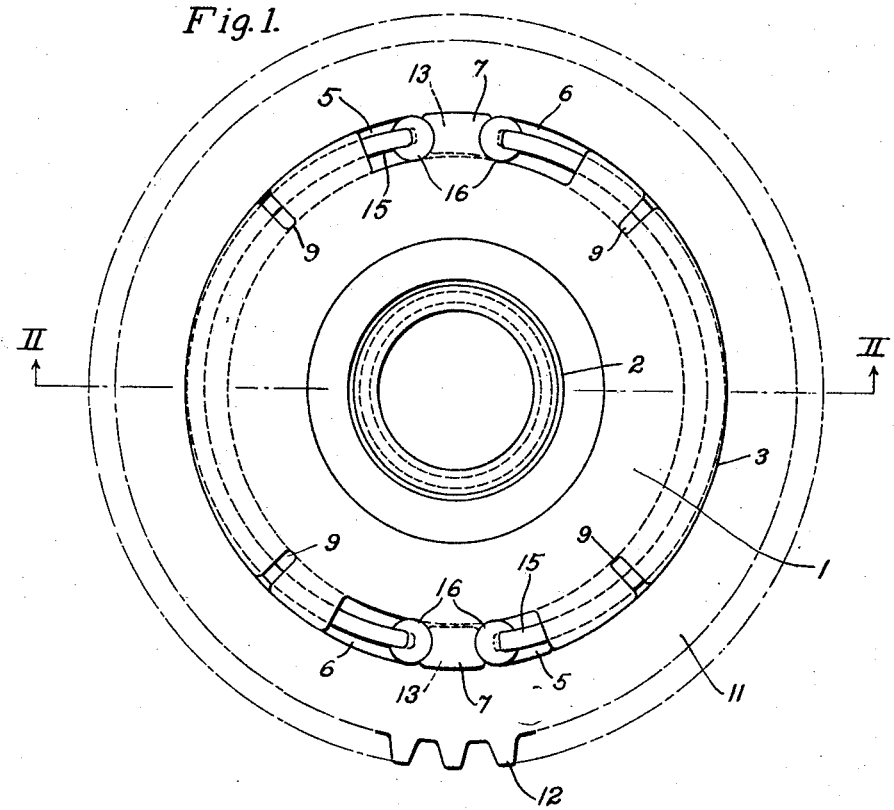
Figure 2:
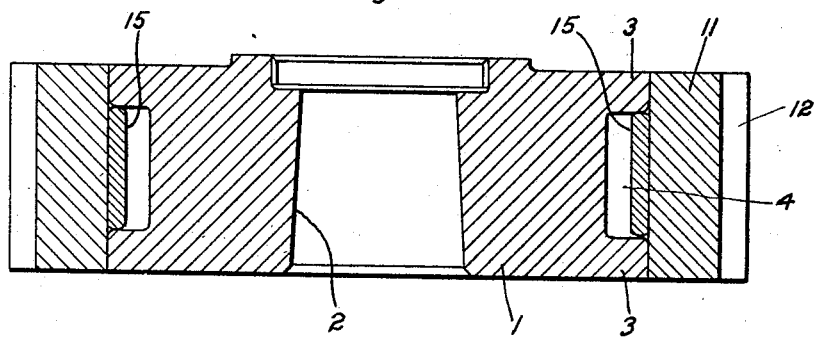
Figure 3:
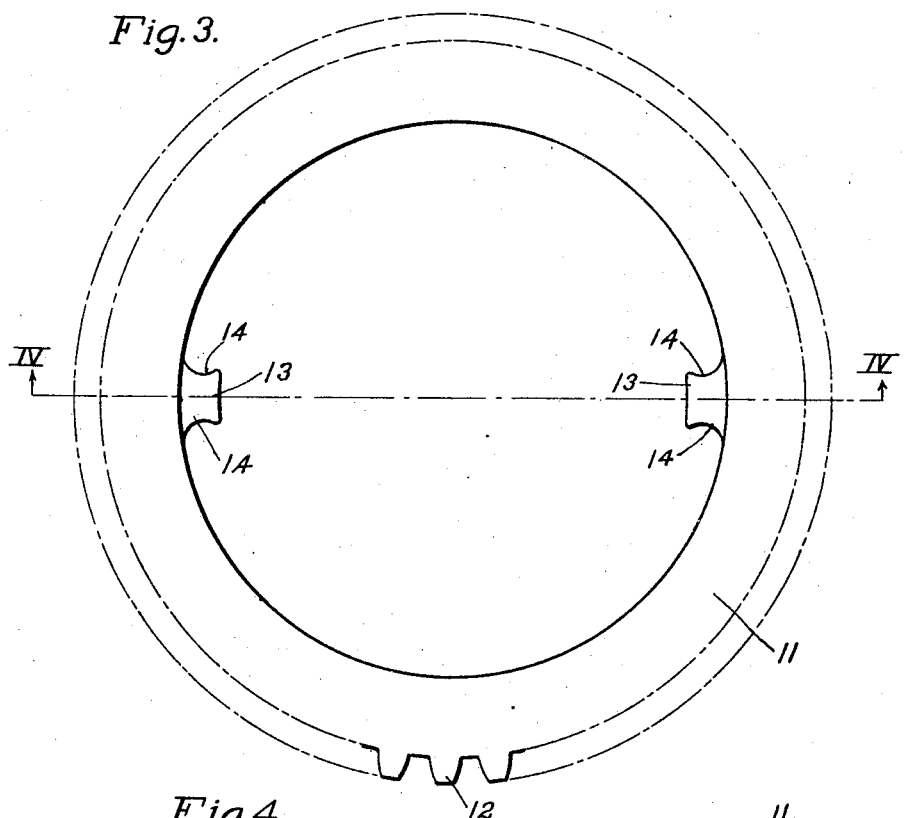
Figure 4:
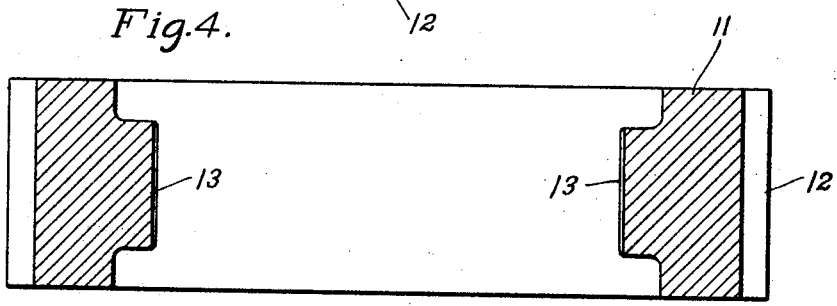

In the accompanying drawings,

Figure 1 is a view in end elevation of a flexible gear wheel embodying the principles of my invention, Fig. 2 is an axial sectional view taken along the line II—II of Fig. 1, Fig. 3 is a view in end elevation of the gear rim shown in Fig. 1, Fig. 4 is a cross-sectional view of the gear rim taken along the line IV—IV of Fig. 3, Fig. 5 is a view in end elevation of the gear center or hub portion, Fig. 6 is an axial sectional view taken along the line VI—VI of Fig. 5, Fig. 7 is a view in side elevation of one of the spring elements embodied in my flexible gear wheel, Fig. 8 is a view in side elevation of a spring socket for engaging the end of the spring element, Fig. 9 is a cross-sectional view of the spring socket taken along the line IX—IX of Fig. 8, and Fig. 10 is a view in end elevation thereof.

Referring to the drawing, the flexible gear wheel illustrated comprises a gear center or hub portion 1 that is provided with a central tapered opening 2 for receiving a shaft (not shown) such as the armature shaft of a motor. Each face of the gear center 1 is provided with a radially extending flange portion 3. As shown, the two flanges 3 form a channel or groove 4 of rectangular cross section which extends entirely around the gear center 1.

Each of the flanges 3 is provided with two substantially square notches 5 disposed in diametrically opposite positions, the notches in one flange being in axial alignment with the notches in the other. A number of larger, rectangularly shaped notches 6 are provided in aligned pairs that are diametrically opposite each other and angularly spaced from the notches 5 and the intervening portions of the flanges 3 constitute oppositely disposed lug members 7.

As illustrated, the lug members 7 are each provided with concave faces 8 to adapt them to be engaged by flexible gear elements that will be described hereinafter. Four relatively narrow notches 9 are provided in each flange 3. The notches 9 are equally spaced about the periphery and symmetrically disposed relative to the lugs 7 to provide access to the channel 4 for a purpose to be hereinafter set forth.

A rim member 11 of substantially the width of the gear center 1 is adapted to be mounted with a bearing fit upon the peripheries of the flanges 3. The inner face of the rim member 11 is provided with a pair of diametrically opposite inwardly projecting lug members 13 that are of substantially the same shape as the lug members 7 and are adapted to fit within the channel 4 and between the axially aligned lugs 7.

The lugs 13 are provided with concave faces 14 that are adapted to be aligned with the faces 8 of the lugs 7 on the gear center 1. The outer periphery of the rim 11 is provided with gear teeth 12 for engaging a co-operating gear wheel (not shown).

The gear rim 11 is operatively connected to the gear center 1 by means of resilient members 15, Fig. 7, each having substantially the shape of a segment constituting somewhat less than half of an annulus. These spring elements 15 are substantially equal in width to the channel 4 in the periphery of the gear center 1 and are adapted to be disposed therein between the cooperating sets of lugs 7 on the gear center 1 and lugs 13 on the rim portions 11 and to bear upon the inner surface of the rim portion 11.

For operatively engaging the spring gear elements 15 with the lug members 7 and 13, spring sockets 16, best shown in Figs. 8, 9 and 10, are provided. The spring sockets 16 comprise cylindrical members adapted to engage the concave faces 8 of the lugs 7 on the gear center 1 and the concave faces 14 of the lugs 13 on the gear rim 11. Longitudinal grooves 17 extend from end to end of the sockets 16 and each groove is provided at its mid portion with a depression 18 that is adapted to receive the end of a spring member 15.

In assembling the gear wheel the spring elements 15 are placed in the channel 4 of the gear center 1. The gear rim 11 is then disposed to align the lugs 13 with the spaces 6 in the flanges 3 and projected into position on the gear center 1. The spaces 6 are made somewhat larger than the spaces 5 in order to receive the lug members 13. The gear rim 11 may then be turned relative to the center 1 until the lugs 13 pass between and come into alignment with the lugs 7 on the center 1 to effectually prevent axial displacement of the rim. A spring socket 16 is mounted in each of the openings 5 and engaged with one end of each of the spring elements 15. Another pair of spring sockets are inserted into the openings 6 to engage the other ends of the springs 15. This may be accomplished by first driving in a wedge member or assembling socket to deflect the spring element 15 a sufficient amount to force it into conformation with the inner surface of the gear rim 11 to permit the socket 16 to be forced into its proper operating position. When the socket 16 is inserted, the initial stress within the spring element 15 will cause it to snap into the depressions 18 in the spring sockets 16 when it will function to hold the sockets securely in their proper positions.

It is apparent from the foregoing that the spring elements 15 serve to secure the gear rim 11 in its proper position upon the gear center 1.

If it becomes desirable to take the gear wheel apart, this may be accomplished by driving wedges into the notches 9 in the flange members 3 to force the spring members 15 into conformation with the rim member 11, thereby causing them to deflect a sufficient amount to allow the spring sockets 16 to be removed. The rim 11 may then be turned until the lugs 13 align with the openings 6 when it may be removed axially from the center portion.

The operation of my flexible gear wheel is briefly as follows:

When torque is transmitted from the center portion 1 to the gear rim 11, each of the lugs 7 on the center 1 engage one of the spring sockets 16 and exert compressive stresses upon one end of each of the spring elements 15. The other end of each of the spring elements engages one of the other spring sockets 16 and exerts force against the lugs 13 on the rim member 11. The spring elements 15 are gradually deflected under torsional load to conform to the inner diameter of the gear rim 11. In the process of deflecting the spring element 15, the distortion starts at the mid portion and progresses in both directions. As the spring elements progressively engage the rim, the total amount of free spring material becomes continuously reduced, and therefore the deflection per unit increase in the torque is reduced correspondingly as the torque is increased.

It is evident from the foregoing explanation of my invention that flexible gear wheels made in accordance therewith provide a compact and durable structure that is adapted to be used where space is limited and to provide the most desirable operating characteristics.

Although I have described a specific embodiment of my invention, it will be obvious to those skilled in the art that various modifications may be made in the details of construction and in the arrangement and relation of the several cooperating parts, without departing from the spirit and scope of my invention as defined in the appended claims.

I claim as my invention:

1. An flexible gear wheel comprising a center portion, a rim portion carried by the center portion, a plurality of segmental spring elements interposed between the center portion and rim portion, and cylindrical spring sockets on the ends of said spring elements for engaging the center portion and rim portion to distribute the load on the spring elements.

2. A flexible gear wheel comprising a center portion, a rim portion carried by the center portion, a plurality of segmental spring elements interposed between the center portion and rim portion, and a plurality of cylindrical spring sockets in engagement with the ends of said spring elements and adapted to cooperate with the gear center portion and rim portion.

3. A flexible gear wheel comprising a center portion, a rim portion carried by the center portion, a spring element interposed between the center portion and rim portion, cylindrical spring sockets on said spring element, and means on the center portion and rim portion for engaging the spring sockets.

4. A flexible gear wheel comprising a center portion, a rim portion carried by the center portion, integral lugs on said center portion and rim portion, said lugs having cylindrical seating portions, a plurality of segmental spring elements interposed between the center portion and rim portion, and cylindrical spring sockets on the ends of said spring elements, said spring sockets being adapted to engage the lugs on the center portion and rim portion.

5. A flexible gear wheel comprising a center portion, a rim portion carried by the center portion, spring elements interposed between the center portions and rim portion, and cylindrical spring sockets for engaging the ends of said spring elements, said spring sockets being adapted to cooperatively engage said center portion and rim portion.

6. A flexible gear wheel comprising a center portion, a rim portion carried by the center portion, annular spring elements interposed between the center portion and the rim portion, and spring sockets on the ends of the spring elements for cooperatively engaging the center portion and rim portion, the spring elements being of different radii than the inner radius of the gear rim portion and adapted to be forced into contact with the gear rim under tangential deflection.

7. A flexible gear wheel comprising a center portion having two pairs of radial lugs diametrically disposed thereon, a rim portion having cooperating lugs adapted to pass between the lugs on the center portion, spring elements in the form of segments of an annulus interposed between the center portion and the rim portion, and cylindrical spring sockets having grooves therein for engaging the ends of the spring elements, said sockets being adapted to engage the lugs on the center portion and rim portion.

8. A flexible gear wheel comprising a hub member a cooperating rim member carried by the hub member, spring sockets for engaging said hub member and rim member, each of said spring sockets comprising a cylindrical member having a longitudinal slot in one side thereof extending from end to end and provided with a depression at its mid portion and segmental spring members for engaging said spring sockets, the ends of said spring members being adapted to enter the depression in said spring sockets.

9. A flexible gear wheel comprising a center portion having outwardly projecting lugs thereon, a rim portion having cooperating inwardly projecting lugs carried by the center portion, a plurality of segmental spring elements disposed between pairs of diametrically disposed cooperating lugs and spring sockets for engaging the ends of said spring elements and the pairs of cooperating lugs.

10. A flexible gear wheel comprising a center portion having pairs of outwardly projecting lugs thereon, a rim portion having cooperating inwardly projecting lugs adapted to pass between the lugs on the center portion, a plurality of segmental spring elements disposed between the pairs of lugs on the center portion and the cooperating lugs on the rim portion, and spring sockets for engaging the ends of said spring elements and the cooperating lugs.

11. A flexible gear wheel comprising a center portion, a rim portion carried by the center portion, segmental spring elements interposed between the center portion and the rim portion, and spring sockets on the ends of said spring elements for cooperatively engaging the center portion and rim portion, said spring elements being adapted to be forced into conformation with the gear rim under tangential deflection.

12. A flexible gear wheel comprising a rim portion having a pair of diametrically disposed inwardly projecting lug members, a hub portion having radially extending flanges on each face thereof for carrying the rim portion, said flanges having diametrically disposed openings for receiving the lug members on the rim portion, and resilient means for operatively connecting said rim portion to said hub portion, said resilient means comprising segmental spring elements that are disposed to conform to the inner surface of the rim portion when torque is transmitted in either direction by the gear-wheel.

13. A flexible gear wheel comprising a hub member having a circumferential channel in its periphery, a rim member of inner diameter substantially equal to the outer diameter of the hub member carried thereby, lugs on the rim member projecting into the channel in the hub member, openings in the sides of the hub member to constitute lug members in normal axial alignment with the lugs on the rim member, spring sockets in engagement with the lugs on the rim member, and segmental spring members for cooperatively engaging said spring sockets, said spring members being disposed to conform progressively to the inner surface of the gear rim when deflected under load.

14. A flexible gear-wheel comprising a center portion, a rim portion carried by the center portion, a plurality of spring elements, spring sockets on the ends of the spring elements, and means on the center and rim portions for rotatably engaging the spring sockets to force the spring elements into engagement with the inner surface of the rim portion to an extent having a definite relation to the torque transmitted by the gear-wheel.

15. A flexible gear-wheel comprising a center portion, a rim portion carried by the center portion, segmental spring elements interposed between the center portion and the rim portion, cylindrical spring sockets on the ends of said spring elements and means for journalling the spring sockets in the center portion and the rim portion, said spring elements being adapted to be forced into conformation with the gear rim under circumferential deflection.

16. A flexible gear-wheel comprising, in combination, a hub, a gear rim carried by the hub, resilient members having the shape of sections of an annulus for transmitting force between the hub and the rim, said resilient members, hub and rim being disposed with a substantially common axis, sockets provided on the resilient members for engaging the hub and the rim and lugs provided on the hub and the rim for receiving the spring sockets, said resilient members being disposed to bear upon the rim at all times and to an extent depending on the force being transmitted.

In testimony whereof, I have hereunto subscribed my name this 5th day of May 1927.

LLOYD HORNBOSTEL.